(Model.)
T. M. O'MALLEY.
NUT LOCK.
No. 290,916.        Patented Dec. 25, 1883.
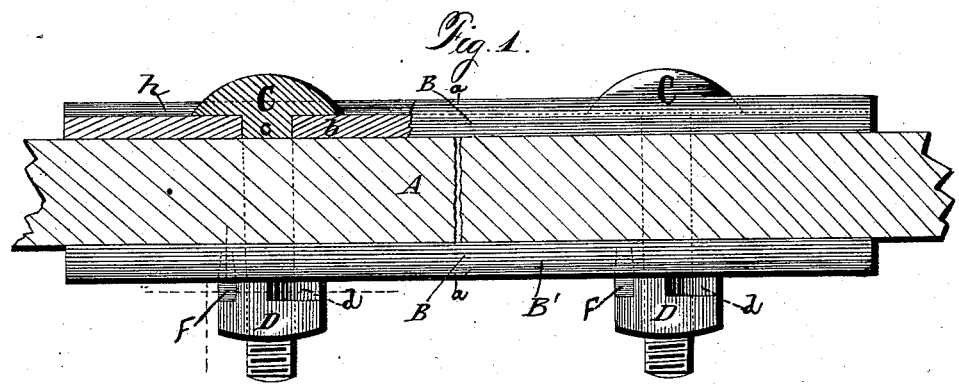
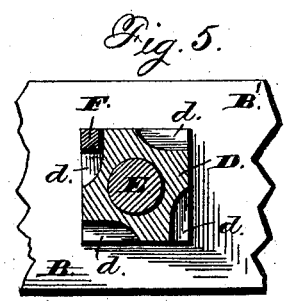
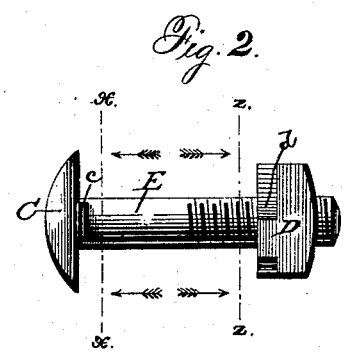
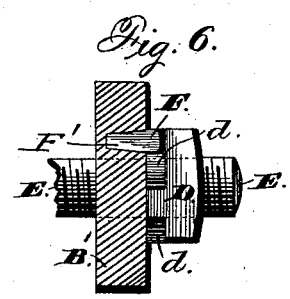
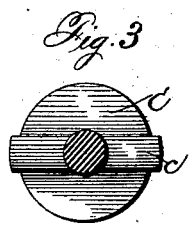
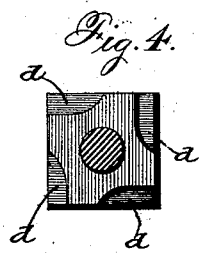
WITNESSES
Jas. E. Hutchinson
A. J. Norton
Thomas M. O'Malley
INVENTOR
By
Jno. F. Kelly
Attorney

UNITED STATES PATENT OFFICE.

THOMAS M. O'MALLEY, OF BELLAIRE, OHIO, ASSIGNOR OF TWO-THIRDS TO ARTHUR GILMARTIN AND JOHN DEEGAN, BOTH OF SAME PLACE.

NUT-LOCK.

SPECIFICATION forming part of Letters Patent No. 290,916, dated December 25, 1883.

Application filed September 12, 1882. (Model.)

*To all whom it may concern:*

Be it known that I, THOMAS M. O'MALLEY, of Bellaire, Belmont county, Ohio, have invented a new and useful Improvement in Nut-Locks; and I declare the following to be a full, clear, and exact description of the same, such as will enable others skilled in the art to which it pertains to make and use it, reference being had to the accompanying drawings, which form a part of this specification.

This invention relates to improvements in nut-locks especially adapted for use in joints of railroad-rails, as shown, and will be described.

In the drawings, Figure 1 represents the device fastened to the rails; Fig. 2, a view of the bolt and nut; Fig. 3, an inner view of the head of the bolt, and Fig. 4 an inner view of the nut.

A represents the railroad-rail.

B and B' represent metallic plates, one placed on each side of the rail where the two rails join, but under the top of the rail.

C is the head of the bolt, made with the device c, so as to fit securely in a groove, h, made in the plate B, as shown in Fig. 1.

D is the nut, made with the suitable shoulders, d, as shown in the drawings.

E is the body of the bolt, made with the threads, as shown in Fig. 2.

The letter F represents a suitable metallic pin of about an inch or so in length and a half or quarter of an inch in thickness. At the point where the middle of the outer edge of the nut D, or where the left end of the shoulder d in the nut D, comes in contact with plate B', a hole is made in plate B' deep enough to hold one-half of the pin F. The shoulders d in nut D are made in the shape of the letter V, or a quarter-circle of sufficient depth to hold the other part of the pin F. The manner in which the pin F operates to lock the nut is this: The bolt E is passed through the plates B and B' (one plate on each side of the rails where they meet) and the rails. The nut D is then screwed on the bolt E up to and tight against the plate B'. Then the pin F is inserted in the hole provided for it in plate B'. Then the nut D is turned a little backward, about one-quarter of a revolution, which brings the pin F within the shoulder d, and then the nut is firmly locked. The right angle of the shoulder d is so made that when it comes in contact with the pin F the nut D will not pass any farther backward, and the left angle is so made that the pin can pass in the shoulder. The four shoulders in the nut D are made so that one will come in contact with the pin by about a quarter of a revolution backward, as above stated. The bolt and nut fit in the plate and rails, as shown by the letters x x and z z in Fig. 2.

At the point where the two railroad-rails meet, the plates B and B' are placed, one on each side of the rail, (each rail having one or more holes near its end a,) one of which plates has the opening for the peg F, as shown in Fig. 1. Into and through the holes in plates B and B' and the two rails is inserted the bolt E, having the head C. Into the plate B' is inserted the peg F. Onto the threaded end of this bolt is screwed the nut D, so as to securely fasten the plates B and B' to the rails. The peg F does not interfere with the nut D, being screwed tight to the plate B'; but after it is so screwed this peg prevents the nut from becoming loose or unscrewed. Heretofore the nuts on all such devices would, from the jarring of the constantly-passing trains, become loose and fall off, which would sometimes cause accidents; but by the construction of the nut as described and shown, and use and application of the key in connection therewith, these cannot now occur.

I therefore claim as my invention and desire to secure Letters Patent thereon—

In a nut-locking device, the combination of the nut D, having a mortise or recess formed on its under side at the corner thereof, the plate B', having a key-mortise, F', formed near the bolt-hole and within the circle described by the corners of the nut D, and the key F, inserted into the mortise F', the nut and key being so arranged relatively to each other that the former will turn back against and cover the head of the latter, as set forth.

In testimony whereof I sign the foregoing in the presence of two witnesses.

THOMAS M. O'MALLEY.

Witnesses:
D. W. COOPER,
J. W. JONES.